(12) United States Patent
Parsche et al.

(10) Patent No.: US 10,581,172 B2
(45) Date of Patent: Mar. 3, 2020

(54) COMMUNICATIONS ANTENNA AND ASSOCIATED METHODS

(71) Applicant: Harris Corporation, Melbourne, FL (US)

(72) Inventors: Francis E. Parsche, Palm Bay, FL (US); Shawn H. Gallagher, Melbourne, FL (US); James L. Ziarno, Malabar, FL (US)

(73) Assignee: HARRIS CORPORATION, Melbourne, FL (US)

( * ) Notice: Subject to any disclaimer, the term of this patent is extended or adjusted under 35 U.S.C. 154(b) by 370 days.

(21) Appl. No.: 15/709,820

(22) Filed: Sep. 20, 2017

(65) Prior Publication Data
US 2019/0089061 A1 Mar. 21, 2019

(51) Int. Cl.
| | | |
|---|---|---|
| *H01Q 11/08* | (2006.01) | |
| *G01S 13/08* | (2006.01) | |
| *H01Q 1/20* | (2006.01) | |
| *H01Q 13/26* | (2006.01) | |
| *H01Q 1/46* | (2006.01) | |
| *H01P 3/10* | (2006.01) | |
| *H04Q 1/36* | (2006.01) | |
| *H01Q 11/02* | (2006.01) | |

(Continued)

(52) U.S. Cl.
CPC ............ *H01Q 11/083* (2013.01); *G01S 13/08* (2013.01); *H01P 3/10* (2013.01); *H01Q 1/20* (2013.01); *H01Q 1/36* (2013.01); *H01Q 1/46* (2013.01); *H01Q 11/02* (2013.01); *H01Q 13/20* (2013.01); *H01Q 13/26* (2013.01)

(58) Field of Classification Search
CPC ......... H01Q 11/083; H01Q 1/20; H01Q 13/26
See application file for complete search history.

(56) References Cited

U.S. PATENT DOCUMENTS 2,663,797 A * 12/1953 Kock ..................... H01Q 13/28
343/786
2,685,068 A * 7/1954 Goubau ................... H01P 3/10
333/240

(Continued)

OTHER PUBLICATIONS

Times Microwave Systems, "T-RAD-600 Leaky Feeder Coaxial Cables", catalog, 4 pps., TRAD600 3/07, 2007. www.timesmicrowave.com.

(Continued)

*Primary Examiner* — Dameon E Levi
*Assistant Examiner* — Jennifer F Hu
(74) *Attorney, Agent, or Firm* — Allen, Dyer, Doppelt + Gilchrist, P.A.

(57) ABSTRACT

A radio frequency (RF) communications system may include a local RF communications device and an RF antenna coupled to the local RF communications device. The RF antenna may include a cavity backing housing, a conical RF launch structure having an apex positioned within the cavity backing housing, and an elongate electrical conductor having a proximal end extending through the apex of the conical RF launch structure and a distal end spaced apart from the conical RF launch structure to define an elongate RF coverage pattern. The system may further include at least one remote RF communications device within the elongate RF coverage pattern to wirelessly communicate with the local RF communications device.

26 Claims, 14 Drawing Sheets

(51) Int. Cl.
*H01Q 13/20* (2006.01)
*H01Q 1/36* (2006.01)

(56) References Cited

U.S. PATENT DOCUMENTS

| | | | | |
|---|---|---|---|---|
| 2,688,732 | A * | 9/1954 | Kock | H01P 3/10 |
| | | | | 333/240 |
| 2,867,778 | A | 1/1959 | Hafner | |
| 2,921,277 | A | 1/1960 | Goubau | |
| 3,509,463 | A | 4/1970 | Watkins et al. | |
| 3,947,835 | A | 3/1976 | Laymon | |
| 4,743,916 | A * | 5/1988 | Bengeult | H01Q 13/20 |
| | | | | 343/707 |
| 4,772,891 | A * | 9/1988 | Svy | H01Q 21/30 |
| | | | | 343/707 |
| 5,067,173 | A | 11/1991 | Gordon et al. | |
| 5,280,472 | A | 1/1994 | Gilhousen et al. | |
| 5,325,105 | A * | 6/1994 | Cermignani | H01Q 13/08 |
| | | | | 343/786 |
| 5,369,801 | A | 11/1994 | Smith | |
| 5,424,864 | A | 6/1995 | Emura | |
| 5,602,834 | A | 2/1997 | Dean et al. | |
| 5,627,879 | A | 5/1997 | Russell et al. | |
| 5,642,405 | A | 6/1997 | Fischer et al. | |
| 5,821,813 | A | 10/1998 | Batchelor et al. | |
| 5,990,835 | A | 11/1999 | Kuntzsch et al. | |
| 6,097,931 | A | 8/2000 | Weiss et al. | |
| 6,112,086 | A | 8/2000 | Wala | |
| 6,396,600 | B1 | 5/2002 | Davies | |
| 6,459,909 | B1 | 10/2002 | Bilcliff et al. | |
| 6,836,660 | B1 | 12/2004 | Wala | |
| 7,009,471 | B2 * | 3/2006 | Elmore | H01P 3/10 |
| | | | | 333/240 |
| 7,286,095 | B2 * | 10/2007 | Parsche | H01Q 9/28 |
| | | | | 343/700 MS |
| 7,345,623 | B2 * | 3/2008 | McEwan | G01F 23/284 |
| | | | | 342/124 |
| 7,567,154 | B2 * | 7/2009 | Elmore | H01P 3/10 |
| | | | | 333/21 R |
| 8,059,050 | B1 | 11/2011 | Johnson | |
| 8,060,218 | B2 | 11/2011 | Singh et al. | |
| 8,063,480 | B2 | 11/2011 | Mukaibara | |
| 8,063,580 | B2 | 11/2011 | Saveliev et al. | |
| 8,064,963 | B2 | 11/2011 | Zhu et al. | |
| 8,237,617 | B1 * | 8/2012 | Johnson | H01Q 13/26 |
| | | | | 343/785 |
| 9,584,252 | B1 | 2/2017 | Salyers et al. | |
| 9,681,360 | B1 | 6/2017 | Salyers et al. | |
| 9,736,706 | B2 | 8/2017 | Salyers et al. | |
| 9,763,095 | B2 | 9/2017 | Salyers et al. | |
| 9,769,666 | B2 | 9/2017 | Salyers et al. | |
| 2006/0284779 | A1 * | 12/2006 | Parsche | H01Q 9/28 |
| | | | | 343/773 |
| 2015/0130675 | A1 * | 5/2015 | Parsche | H01Q 13/28 |
| | | | | 343/731 |
| 2017/0094521 | A1 | 3/2017 | Salyers et al. | |

OTHER PUBLICATIONS

Goubau, "Surface Waves and Their Application to Transmission Lines", J. Appl. Phys. 21, 1119, 1950, Abstract Only.

Tan et al., "UTD Propagation Model in an Urban Street Scene for Microcellular Communications", Electromagnetic Compatibility, IEEE, vol. 35, Issue 4, Nov. 1993, Abstract Only.

Garcia Sanchez et al., "Microcellular Propagation Modelling Including Antenna Pattern and Polarization", Antennas and Propagation Society International Symposium, 1995. AP-S. Digest, vol. 118-23 Jun. 1995, abstract.

Kim-Fung et al., "Radiosity Method: A New Propagation Model for Cellular Communication", Antennas and Propagation Society International Symposium, 1998. IEEE, vol. 4, Jun. 21-26, 1998, Abstract Only.

Weber et al., "Wireless Indoor Positioning: Localization Improvements with a Leaky Coaxial Cable Prototype", 2011 International Conference on Indoor Positioning and Indoor Navigation (IPIN), Sep. 21-23, 2011, Gumaraes, Portugal, 3 pp.

U.S. Appl. No. 15/709,838, filed Sep. 20, 2017.
U.S. Appl. No. 15/153,786, filed May 12, 2016.
U.S. Appl. No. 15/420,167, filed Jan. 31, 2017.

* cited by examiner

COMMUNICATIONS ANTENNA AND ASSOCIATED METHODS

FIELD OF THE INVENTION

The present invention relates to the field of communications and, more particularly, to wireless communications and related methods.

BACKGROUND OF THE INVENTION

Current cell towers provide free space radiation and directional antenna sectors. The required narrow antenna beams to cover only a highway cannot be realized at 698 to 2700 MHz cellular frequencies. For example, for a 10 mile long by 100 foot wide highway coverage cell, the beamwidth required is $\tan^{-1}(100/52800)=0.11$ degrees, which may require a 65 dBi gain antenna hundreds of wavelengths in diameter. Additionally, the resulting cell would not be rectangular, but triangular shaped and the signal strength would not be uniform. Other problems with towers include unreachable spaces (building interiors, tunnels, backside of hills), cannot realize a strip shaped coverage cell, will not provide road only coverage, cells cannot follow a turn in a road, limited frequency reuse, low security and too far for self-powered RFID.

A single-wire transmission line (SWTL or single wire method) is a method of transmitting electrical power or signals using only a single electrical conductor. In a publication by Georg Goubau, entitled "Surface waves and their Application to Transmission Lines," Journal of Applied Physics, Volume 21, November (1950), a surface wave mode along a wire is discussed. Electric and magnetic fields along the wire were linearly polarized, e.g. they did not rotate about the wire axis as would rotationally polarized fields.

In U.S. Pat. No. 2,685,068 entitled "Surface Wave Transmission Line" Goubau proposed the application of a dielectric layer surrounding the wire. Even a rather thin layer (relative to the wavelength) of a dielectric will reduce the propagation velocity sufficiently below the speed of light, eliminating radiation loss from a surface wave along the surface of a long straight wire. This modification also had the effect of greatly reducing the radial footprint of the electromagnetic fields surrounding the wire, addressing the other practical concern. Radiation from the wire was not for wireless communication and a separate radiating antenna was provided. The wire supplied the separate radiating antenna was wired to the SWTL to exchange conducted electric currents. Electric and magnetic fields along the wire were linearly polarized.

In U.S. Pat. No. 2,921,277 entitled "Launching and Receiving of Surface Waves" Goubau also proposed a method for launching (and receiving) electrical energy from such a transmission line. The Goubau line (or "G-line") includes a single conductor coated with dielectric material. At each end is a wide disk with a hole in the center through which the transmission line passes. The disk may be the base of a cone, with its narrow end connected typically to the shield of coaxial feed line, and the transmission line itself connecting to the center conductor of the coax. Even with the reduced extent of the surrounding fields in Goubau's design, such a device only becomes practical at UHF frequencies and above. Wireless communication by wire radiation was not described.

More recently, a product has been introduced under the name "E-Line" which uses a bare (uncoated) wire, but employs the cone launchers developed by Goubau. Thus, the resulting wave velocity is not reduced by a dielectric coating, however the resulting radiation losses may be tolerable for the transmission distances intended. The intended application in this case is not power transmission but power line communication, that is, creating supplementary radio frequency channels using existing power lines for communications purposes. This has been proposed for transmission of frequencies from below 50 MHz to above 20 GHz using pre-existing single or multi-strand overhead power conductors. Communications to mobile units was not described.

For example, U.S. Pat. No. 7,009,471 entitled "Method and Apparatus for Launching a Surface wave onto a Single Conductor Transmission Line Using a Slotted Flared Cone" to Elmore discloses an apparatus for launching a surface wave onto a single conductor transmission line that provides a launch including a flared, continuously curving cone portion, a coaxial adapter portion, and a wire adapter portion for contacting the wire conductor which allows for a multiplicity of wire dimensions for either insulated or uninsulated wire, or a tri-axial wire adapter device enabling non-contacting coupling to a wire. A longitudinal slot is added to the flared cone, wire adapter, and coaxial adapter portions of the launch to allow direct placement of the launch onto existing lines, without requiring cutting or threading of those lines for installation.

Also, U.S. Pat. No. 7,567,154 entitled "Surface Wave Transmission System Over a Single Conductor Having E-fields Terminating Along the Conductor" to Elmore discloses a low attenuation surface wave transmission line system for launching surface waves on a bare and unconditioned conductor, such as are found in abundance in the power transmission lines of the existing power grids. The conductors within the power grid typically lack dielectric coatings and special conditioning. A first launcher, preferably includes a mode converter and an adapter, for receiving an incident wave of electromagnetic energy and propagating a surface wave longitudinally on the power lines. The system includes at least one other launcher, and more likely a number of other launchers, spaced apart from one another along the constellation of transmission lines. The system and associated electric fields along any given conductor are radially and longitudinally symmetrical.

It may be desirable to obtain precise communications coverage areas, for frequency reuse, communications privacy, and security needs, for example, including microcellular telephone coverage, communications, especially communications to mobile units, and communications inside mines, tunnels, buildings, or hallways, or for Radio Frequency Identification Device (RFID) tracking.

SUMMARY OF THE INVENTION

A radio frequency (RF) communications system may include a local RF communications device and an RF antenna coupled to the local RF communications device. The RF antenna may include a cavity backing housing, a conical RF launch structure having an apex positioned within the cavity backing housing, and an elongate electrical conductor having a proximal end extending through the apex of the conical RF launch structure and a distal end spaced apart from the conical RF launch structure to define an elongate RF coverage pattern. The system may further include at least one remote RF communications device within the elongate RF coverage pattern to wirelessly communicate with the local RF communications device.

The RF antenna may further include a clamp positioned behind the cavity backing housing, and the proximal end of the elongate electrical conductor may be connected to the clamp. In accordance with one example, the system may further include a coaxial cable extending between the local RF communications device and the RF antenna, with the coaxial cable having an outer conductor electrically coupled to the conical RF launch structure and an inner conductor electrically coupled to the elongate electrical conductor.

By way of example, the cavity backing housing may comprise a cylindrical cavity backing housing. Furthermore, the conical launch structure may further have an open base end positioned outside of the resonant cavity backing housing. In accordance with one example implementation, the system may further include a reel, and the elongate electrical conductor may be carried by the reel in a stored position. Furthermore, the system may also include a time domain reflectometer (TDR) coupled to the elongate electrical conductor and configured to determine a distance to an object adjacent the elongate electrical conductor along a length thereof.

Additionally, the system may further include at least one termination load coupled to the distal end of the elongate electrical conductor. Furthermore, the antenna may also include a plurality of spaced apart conductors coupled to the elongate electrical conductor. In another example implementation, the system may further include a plurality of spaced apart repeaters coupled to the elongate electrical conductor.

A related RF antenna, such as the one discussed briefly above, and a related RF communications method are also provided. The method may include using an RF antenna coupled to a local RF communications device. As described above, the RF antenna may include a cavity backing housing, a conical RF launch structure having an apex positioned within the cavity backing housing, and an elongate electrical conductor having a proximal end extending through the apex of the conical RF launch structure and a distal end spaced apart from the conical RF launch structure to define an elongate RF coverage pattern. The method may further include using at least one remote RF communications device within the elongate RF coverage pattern to wirelessly communicate with the local RF communications device.

DETAILED DESCRIPTION OF THE PREFERRED EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1A:
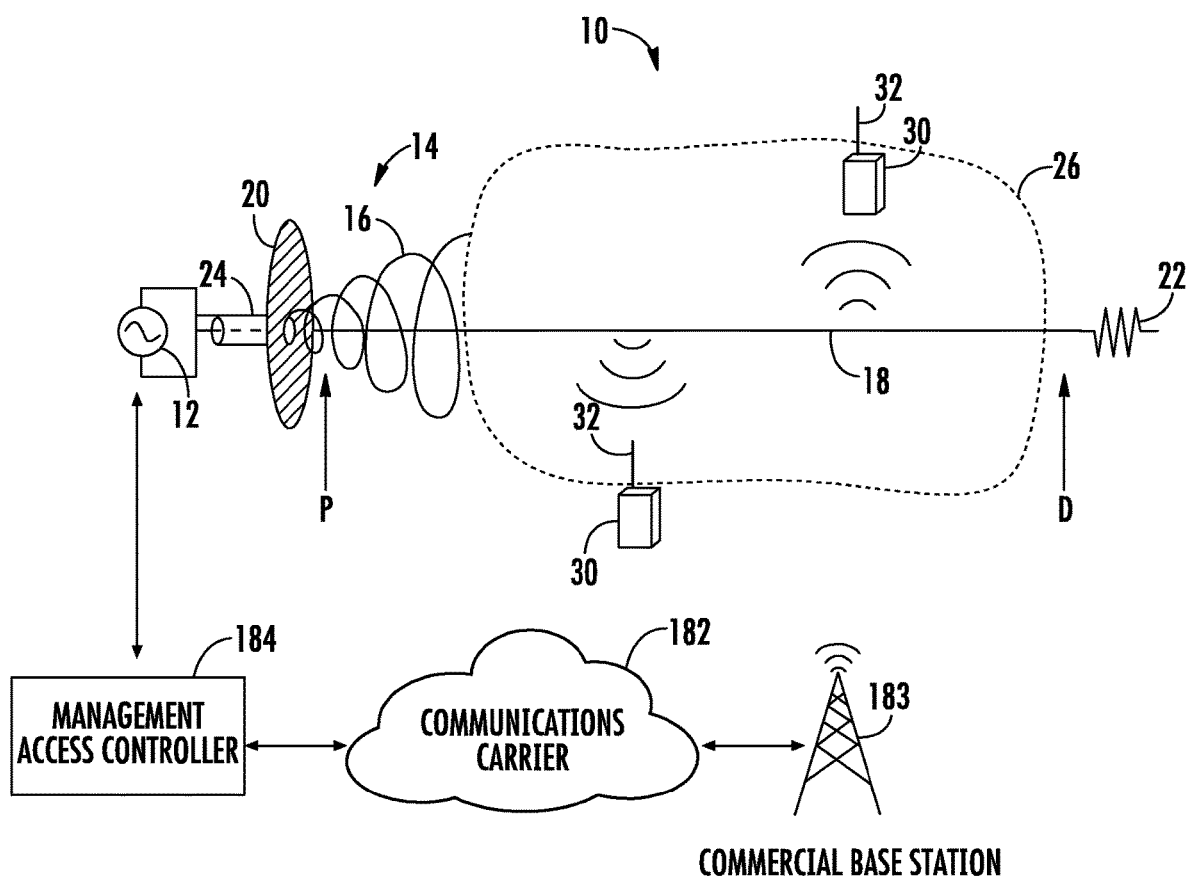
FIG. 1A is an orthographic view and schematic diagram illustrating a managed access system including a radio frequency (RF) communications antenna according to a present embodiment.
Figure 1B:
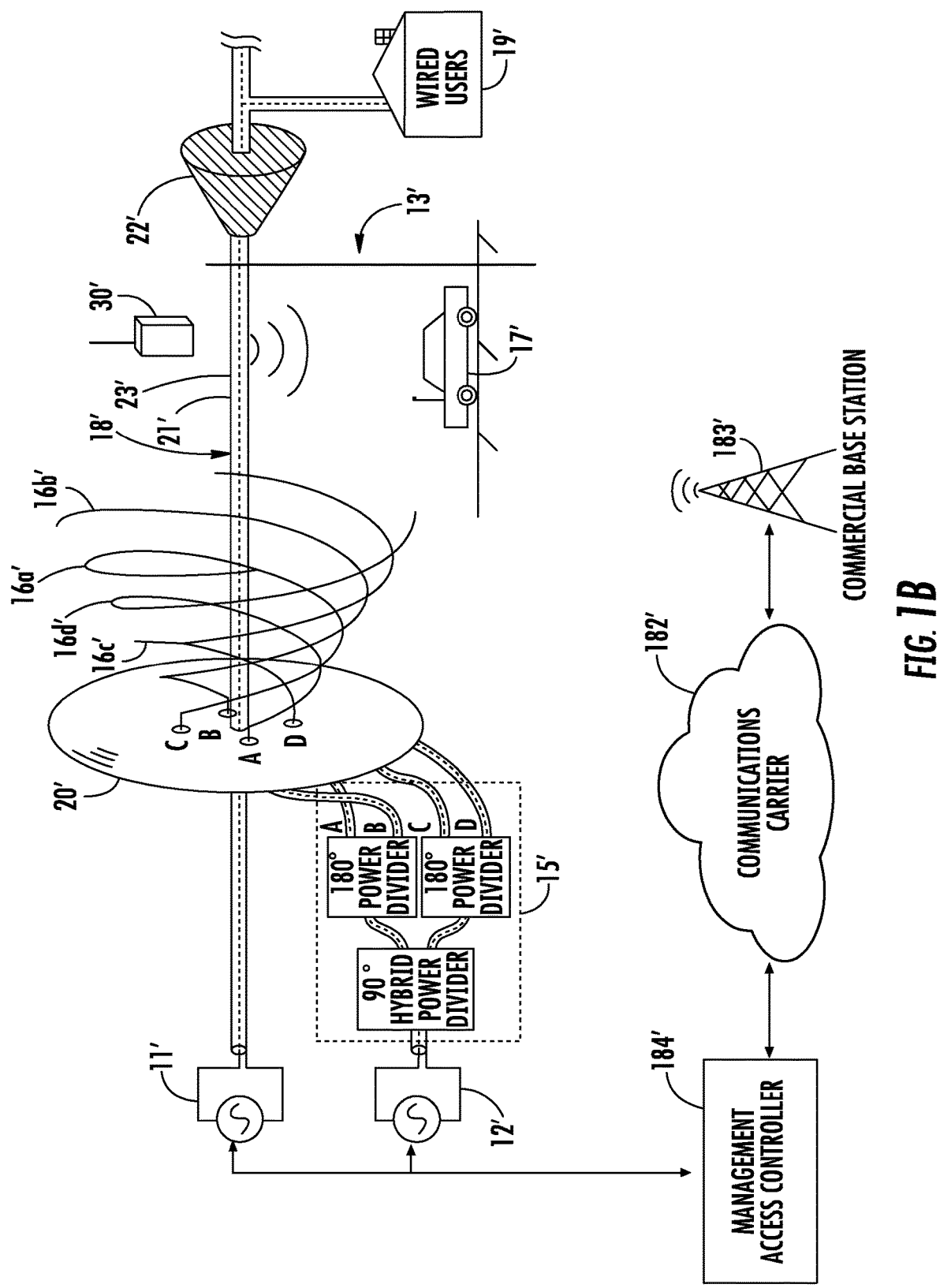
FIG. 1B is a schematic diagram illustrating an alternative embodiment of the managed access system with an RF antenna having coaxial cable elongate conductors.
Figure 2:
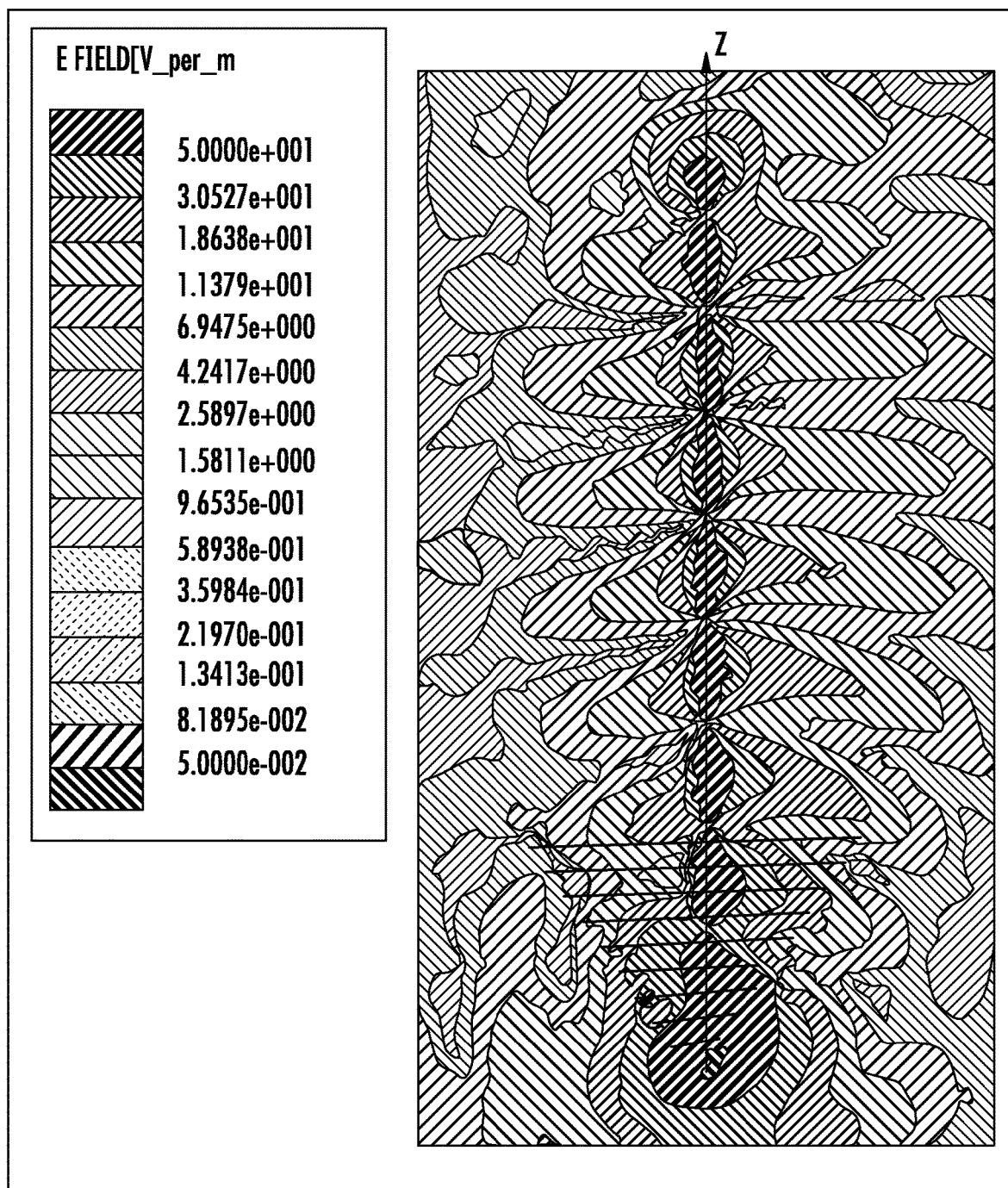
FIG. 2 is a schematic graph illustrating the E fields and the elongate RF coverage pattern of the system in FIG. 1.
Figure 3:
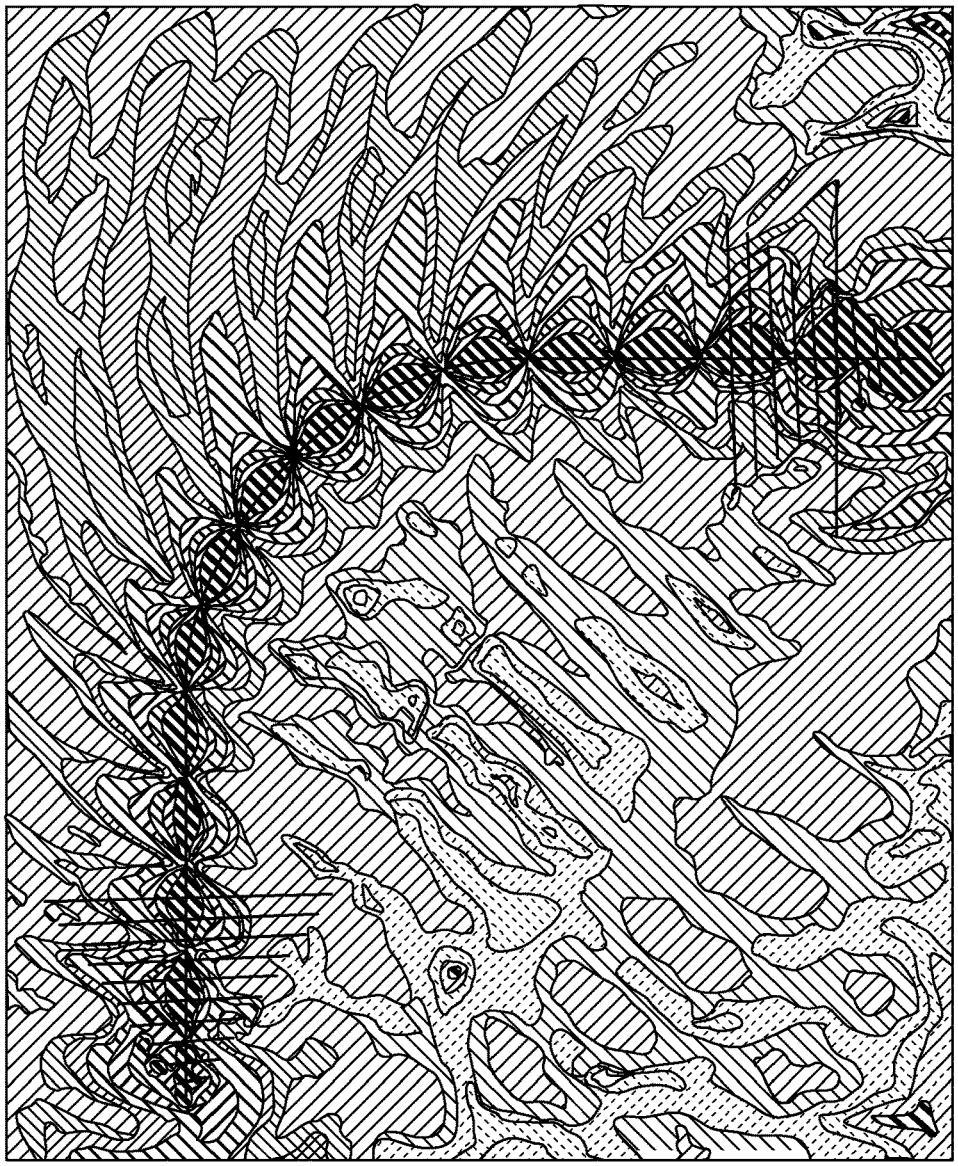
FIG. 3 is a schematic graph illustrating the E fields and the elongate RF coverage pattern of the system in FIG. 1.

Referring initially to FIGS. 1-3, a managed access radio frequency (RF) communications system 10 in accordance with the present embodiments will be described. Dark lines in FIGS. 1-3 represent electrically conductive material. The system 10 illustratively includes a local RF communications device 12 and an RF antenna 14 including a conical RF launch structure 16 coupled to the local RF communications device 12, and one or more elongate electrical conductors 18 having a proximal end P coupled to the conical RF launch structure 16 and a distal end D spaced apart from the conical RF launch structure 16 to define an elongate RF coverage pattern 26 (e.g. as shown in FIGS. 2 and 3). The local RF communications device 12 may be coupled to the RF antenna 14 via a coaxial cable 24. At least one remote RF communications device 30, within the elongate RF coverage pattern, wirelessly communicates with the local RF communications device 12. Although only transmission or reception may be recited, it is understood here that radio frequency communications system 10 can provide bidirectional communications, e.g. both transmit and receive.

The RF antenna 14 may be deployed at a protected area that is geographically within a wireless communications network of a communications carrier 182, which is illustratively represented by a commercial base station/cellular tower 183 in FIG. 1A. A managed access controller 184 may advantageously be coupled to the local RF communications device 12 and permit authorized wireless devices 30 to communicate via the wireless communications network, as will be discussed further below with reference to FIGS. 11 and 12.

The remote RF communications device 30 is preferably a mobile two-way RF communications device having voice and data communications capabilities, such as a cellular telephone or smart phone, for example. Other wireless communication formats, such as RFID, WiFi, HAM radio, etc., may also be used by the remote RF communications device 30. The remote RF communications device 30 may be mounted in an automobile 17. The remote RF communications device 30 may use many types of remote antennas 32, such as half wave dipole antennas, whip antennas, loops, microstrip patch or planar inverted F (PIFA) antennas. The remote antenna 32 need not be a horn launcher, nor need it be concentric around the elongate electrical conductor 18, nor need it be in conductive electrical contact with the elongate electrical conductor 18, although these could be used if desired.

The remote RF communications device 30 may be loosely coupled electromagnetically to the elongate electrical conductor 18 so that many remote RF communications devices 30 are operable at once. In other words, the capture area of the antenna 32 may be small and only a tiny amount of electromagnetic energy intercepted off the elongate conductor 18. Loose coupling levels may range from about −10 to −160 dB, e.g. −10 dB<$S_{21}$<−160 dB, where port 1 is the terminal of the conical RF launch structure 16 and port 2 is the terminals of the antenna 32. Required coupling levels may vary with link budget parameters, including RF power level, receiver sensitivity, bandwidth, required quality of service, etc. Tighter coupling levels may be used for operation of wireless powered remote RF communications devices 30 that obtain their prime operating power from electromagnetic energy surrounding elongate electrical conductor 18. Thus the system 10 may provide also single conductor electrical power delivery.

The elongate RF coverage pattern provides a precise communications coverage area such as for microcellular telephone coverage, or communications inside mines, tunnels, buildings, ships or hallways, or for RFID tracking. The elongate electrical conductor 18 guides the waves to shape the coverage area. The elongate electrical conductor 18 can be routed where the coverage is desired, e.g. around a smooth bend as illustrated in FIG. 3. The electromagnetic waves follow the elongate electrical conductor 18, or wire, as a surface wave due to continuous refraction and traveling wave physics. Examples of elongate electrical conductors 18 may include metal wires, solid stranded or braided, or metal railings, metal tracks, metal pipes, a carbon fiber, a conductive tape, or even the wires of a high voltage electrical power line.

In conventional electromagnetic wave propagation, without the elongate electrical conductor 18 the wave weakens with distance due to spherical wave expansion or "spreading loss" at a rate of $1/r^n$, where r is the range away from the source antenna and n is the exponent of wave expansion. In free space the exponent of wave expansion is a value of 2. So for instance a doubling of range in free space results in a four-fold or 6 dB reduction in signal strength. The elongate electrical conductor 18 acts to reduce or eliminate this wave spreading loss by providing a substrate for surface wave propagation. The degree to which the wave spreading occurs is controlled by elongate conductor 18 characteristics. A bare smooth metallic conductor 18 allows more wave spreading to occur while dielectric coated conductors, stranded braided, stranded twisted, roughed surfaced, or oxide coated conductors 18 allow less wave spreading to occur. Thus the system 10 provides a controlled electromagnetic field coverage area by regulation of wave spreading, and by other means including parasitic radiating elements. The system 10 would have a wave propagation expansion loss exponent of n=2 if no elongate electrical conductor 18 is present, as is common for most wireless communications. A loss exponent of n=0.2 may occur for a dielectric coated stranded metal braid electrical conductor 18, corresponding to 9 dB of loss for a 1 mile long of elongate conductor 18. Thus elongate electrical conductor 18 characteristics may control the axial and radial signal coverage contours.

The conical RF launch structure 16 may be a broadband conical helix launcher and comprise one or more curved electrical conductors defining one or more a conical helices. Such curved electrical conductor has a proximal end at an apex of the conical helix and a distal end at a base of the conical helix. The local RF communications device 12 has a first terminal coupled to the proximal end of the curved electrical conductor and a second terminal coupled to the proximal end of the elongate electrical conductor 18. An electrically conductive shield 20 may be coupled to the proximal end of the curved electrical conductor of the conical RF launch structure 16. The electrically conductive shield 20 may be a circular metal plate that eliminates unwanted radiation off the end of the elongate electrical conductor 18 such as in a reflector or backfire mode. Without the electrically conductive shield 20 the conical RF launch structure 16 may fire in both directions along the elongate electrical conductor 18.

Referring to now FIG. 1B, an alternate embodiment 10' of the apparatus will now be described. Structures in FIG. 1B may not proportional in order to provide a more detailed depiction. The FIG. 1B alternate embodiment 10' embodiment uses a coaxial cable elongate electrical conductor 18' to provide two communications modes: 1) a wired service for wired subscribers only, and 2) a wireless communications service for fixed, portable or mobile subscribers. The information carried on the wired mode and wireless mode may be the same or different, as electrical isolation exists between the transmission modes on the inside of the coaxial cable and the transmission modes on the outside of the coaxial cable. In the FIG. 1B embodiment the interior of the coaxial cable elongate electrical conductor 18' may function as a conventional coaxial cable and the cable exterior can guide surface waves from the conical RF launch structure 16'.

Continuing to refer to FIG. 1B, a coaxial elongate electrical conductor 18' has a conductive inner conductor 23' and a conductive outer shield conductor 21'. A dielectric coating may or may not present over the coaxial elongate electrical conductor 18', and both coated and uncoated coaxial elongate electrical conductors may be used. Conductive outer shield conductors 21' may include solid metal tubes, braided metal wires, metal foil, or even conductive paint. The coaxial elongate electrical conductor 18' may be, for example, a new or legacy cable television service coaxial cable supported by utility poles 13', or legacy telephone conductors. Wireless RF communications device 12' provides the wireless service and the wired RF communications device 11' provides the wired service. A usage example includes the wireless RF communications device 12' providing cellular telephone service, and wired RF communications device 11' providing cable television programming. Another usage example includes the wireless RF communications service 12' being mobile data service for personal electronic devices (PEDS), and wired RF communications device 11' being fixed data service to homes. The FIG. 1B embodiment may advantageously provide "last mile" bandwidth distribution in residential areas using new or legacy coaxial cables. The embodiment opens up a new information channel(s) and RF spectrum as the inside of the coaxial cable may carry different information and spectrum. Conversely, the inside of the coaxial elongate electrical conductor 18' may carry the same information that the outside of the coaxial elongate electrical conductor 18' carries.

Continuing the FIG. 1B embodiment, reflector 20' may be formed of two sheet metal halves and joined together over the coaxial elongate electrical conductor 18'. One or more wired subscribers 19' may be receive wired services from the wired RF communications device 11' by using one or more power dividing taps on the coaxial elongate electrical conductor 18'. Absorber 22' may be located where it is desired to terminate or suspend wireless service. Absorber 22' may be a wave absorber such as a cone of graphite loaded polyurethane foam or one or more resistors. For example, a 240 ohm metal film resistor located ¼ wavelength from the end of the elongate electrical conductor 18' may be used to terminate over narrow bandwidth, or a string of resistors tapered in value may be used for broader bandwidths. One or more conical RF launch structures 16a'-16d' may be used. More than one conical RF launch structure improves rotational polarization circularity. FIG. 1B shows, for example, 4 conical RF launch structures 16a', 16b', 16c', 16d' fed with 0, 90, 180 and 270 degree phasing respectively from the phasing matrix 15'. Reference indicators A, B, C, D are the index to the coaxial cable harness connections between the phasing network and the 4 conical RF launch structures. Phasing network 15' may be a Butler Matrix type phasing network to provide the quadrature (0, 90, 180 and 270 degree) phasing. Of course other numbers of arms and phasing increments may be used, such as say a two arm spiral at 0, 180 degrees phase.

Examples of useful dimensions for the conical RF launch structure 16, 16' will now be described. At the lowest desired frequency of operation the large end or "mouth" of the conical RF launch structure 16, 16' can be d=0.68$\lambda_c$ in diameter. The length can be 1=0.59$\lambda_c$, where $\lambda_c$ is the wavelength at the lowest frequency of operation calculated as $\lambda_c$=c/$f_c$, where c is the speed of light in meters per second and $f_c$ the lowest desired operating frequency in cycles per second. The conical helix is wound of copper wire on a 49 degree hollow fiberglass or polystyrene cone. The number of turns is 14 and a progressively tighter pitch is used towards the small end of the cone. Metal tape windings (not shown) of logarithmically increasing width may also comprise the winding, e.g., a log spiral winding. Electrically conductive shield 20, 20' is a circular brass plate d=0.9$\lambda_c$ wavelengths in diameter. Other surface wave launch structures 16, 16' may be used. The conical RF launch structure 16, 16' is a high pass device providing many octaves of bandwidth above a lower cutoff frequency. Many dimensional trades are possible.

The conical RF launch structure 16, 16' advantageously provides an electrical impedance transformation between the wave impedance of the fields guided along the elongate electrical conductor 18, 18' and the circuit impedance of the local RF communications device 15', 11', 12'. For an elongate electrical conductor 18' having a smooth bare surface, the guided wave impedance may be similar to free space and 377 ohms. For a dielectric coated and braided elongate electrical conductor 18' the guided wave impedance may be 200 to 300 ohms. The local RF communications device 15' source/load impedance may be any; however 50 ohms may be preferred for convention. In such an embodiment the impedance transformation ratio of the conical RF launch structure 16' is 377/50=7.5 to 1.

Impedance matching provisions in the conical RF launch structure 16, 16' may include: tapering the wire gauge throughout the winding; tapering the width of a tape conductor winding; varying the diameter of the elongate electrical conductor 18, 18' inside the conical RF launch structure 16, 16', e.g. a bulge there; varying the winding envelope away from conical, e.g. an exponential or logarithmic cone taper, dielectric fills, etc. At higher frequencies, where conical RF launch structure 16, 16' overall size may be small, impedance transformation can be improved by a long conical RF launch structure, such as a 5 or 10 degree cone form instead of a 49 degree cone form. Dielectric and magnetic coatings on the elongate electrical conductor 18, 18', such as Teflon or ferrite, may vary the surface wave impedance away from 377 ohms and the radial extent of the fields surrounding the elongate conductor.

A conical helix surface wave launch structure 16, 16' may cause a rotationally polarized surface wave to attach and propagate along the elongate electrical conductor 18, 18'. Here the term rotationally polarized fields is understood to include elliptically polarized fields, circularly polarized fields or both.

In addition, a traveling wave current distribution may convey on the length of the elongate electrical conductor 18, 18'. The current maximas, e.g. "lumps of current", move along at near the speed of light. Radio frequency (RF) communications system 10, 10' may advantageously generate a rotationally polarized mode of surface wave propagation along the elongate electrical conductor 18, 18'.

Figure 4:
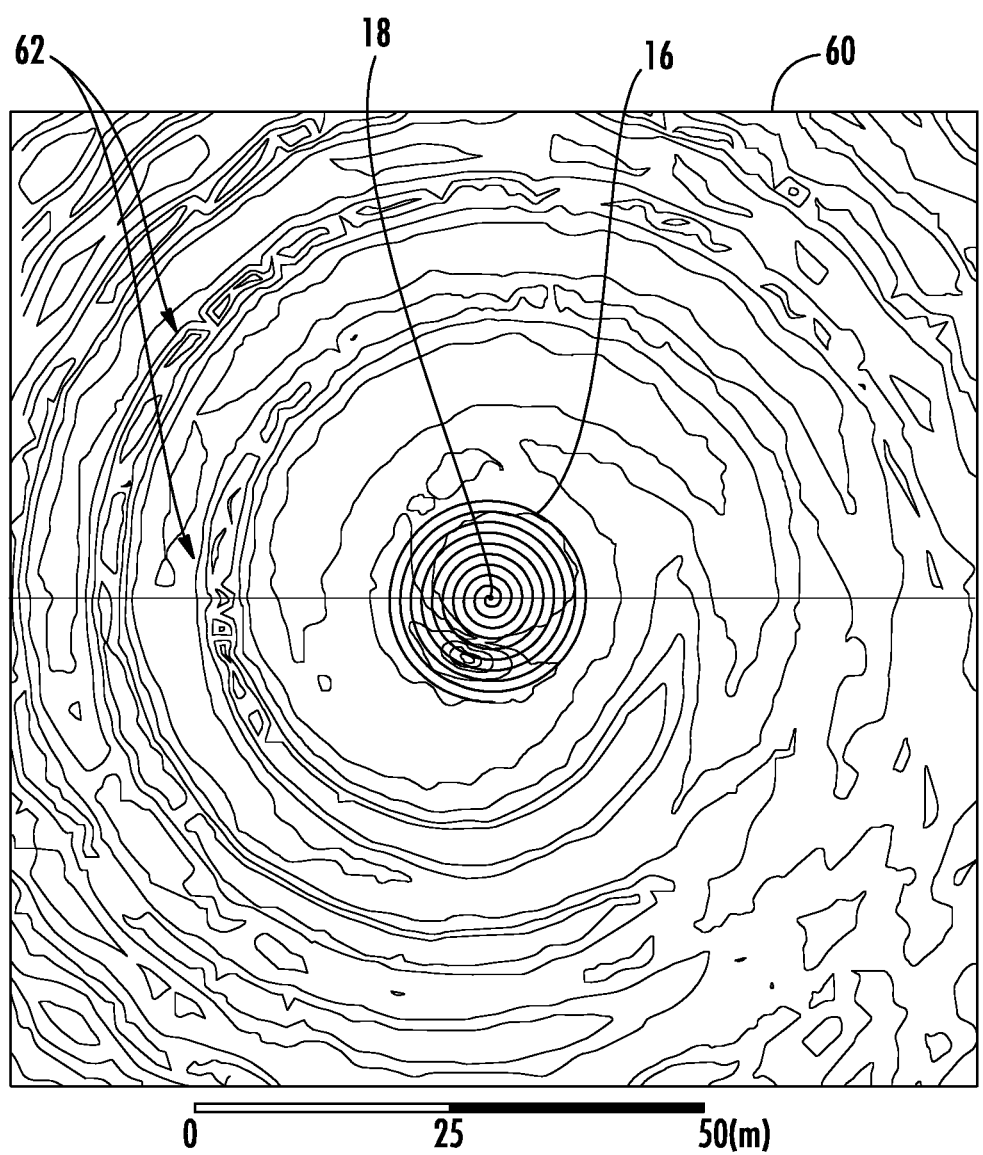
FIG. 4 is a cross sectional view of circularly polarized magnetic fields rendered according to the system in FIG. 1.

Referring to FIG. 4, cross sectional cut 60, magnetic field strength contours 62 at an intermediate point along the elongate electrical conductor 18, 18' will now be described. Conical RF launch structure 16, 16' is seen in profile in the center and the elongate electrical conductor 18, 18' is oriented out of the page. Electrically conductive shield 20, 20' is present but not shown for clarity. The contours were obtained by finite element simulation and are for an instant in time without any averaging. As can be seen, the magnetic field strength contours 62, 62' are curling to resemble Archimedean spirals so the magnetic flux lines may be Archimedean spirals as well. The spiraling magnetic fields rotate in time about the elongate electrical conductor 18, 18' as the excitation phase advances and the electromagnetic energies propagate.

As background, magnetic field strength contours for a linear polarization (not shown) produced by a solid metal cone conical RF launch structure 16, 16' (not shown) would be closed circles instead of spirals. The spiral winding of the conical launch structure 16, 16' may advantageously provide rotational polarization about the elongate electrical conductor 18, 18', which may be preferential for reduced fading to the remote RF communication devices 20, 20'.

Also, to reduce and/or eliminate the reflection of current or wave patterns, at least one termination load 22, 22' may be coupled to the distal end D of the elongate electrical conductor 18, 18'. Such a termination load 22, 22' may include a plurality of terminal resistors coupled together in series with corresponding resistance values increasing away from the distal end D of the elongate electrical conductor 18, 18'. For example, eight terminal resistors having resistor values of 10, 20, 40, 80, 160, 320, 640, and 1280 ohms may be used. Wave absorber termination examples include a cone base 1.5 wavelengths in diameter, a cone length 2 wavelengths long, and a material bulk electrical conductivity of 0.04 mhos/meter. The elongate electrical conductor 18, 18' may run through the length of a conical graphite loaded foam termination 22, 22'.

Figure 5:
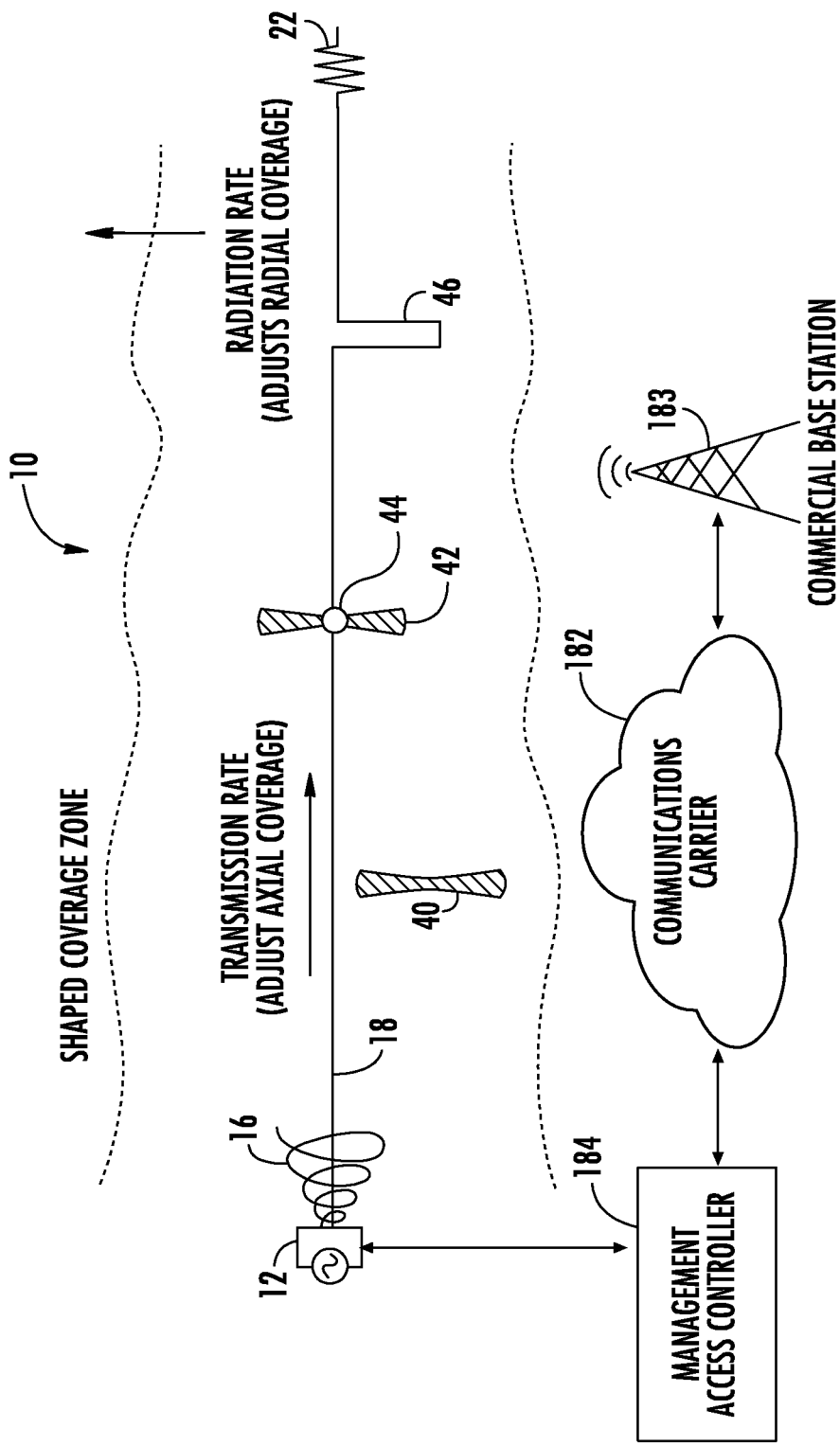
FIG. 5 is a schematic diagram illustrating a managed access system including an RF antenna according to another embodiment.

Referring to FIG. 5, uniform signal strength may be possible throughout the coverage area by progressively increasing the radiation rate of the elongate electrical conductor 18 or guide wire. Signal strength contouring may be accomplished by removing or adding wire insulation, changing wire twist or thickness, or adding kinks or knots in the wire. The more radial coverage results in less axial coverage, and vice versa. Adding dielectric or magnetic coatings causes electromagnetic fields to hug closer to the elongate electrical conductor 18, 18' to reduce radial range and increase axial range. Perturbations on the wire increase radiation. Negative index of refraction materials, such as manmade metamaterial may be placed on the guide wire to spread the fields and increase radial coverage. An example of a negative index of refraction is a matrix of tiny metallic split ring resonators.

A plurality of spaced apart antennas 40, 42, 44 may be coupled to the elongate electrical conductor 16. For example, series fed U-shaped folded dipole antennas may be spliced into the wire 18. In general, many antenna forms will reradiate if brought into proximity with the elongate electrical conductor 18, for instance wires can hang from the elongate electrical conductor 16 to form radiating dipoles, the structure looking like icicles. Conductive electrical contact is not necessary for the re-radiation. Also, a plurality of spaced apart repeaters may be coupled to or spliced into the elongate electrical conductor 16. Repeaters may comprise instantaneous bidirectional amplifiers such as the hybrid ring type, dual ferrite circulator type, bidirectional transistor type such as set forth in U.S. Pat. No. 5,821,813 to Batchelor et al. (which is hereby incorporated herein in its entirety by reference), or noninstantaneous switched direction types.

With two elongate conductor propagation modes several synergies are possible. A coaxial elongate electrical conductor 18' may feed one or more than conical RF launch structure 16'. So, there may be many conical RF launch structures 16' spaced apart along the coaxial cable, each one tapping into signals from the inside of coaxial elongate electrical conductor 18' for refeeding the coaxial cable exterior. Alternatively, the coaxial cable exterior mode may re-feed the coaxial cable interior mode at intervals.

Thus, the above-described embodiments provide a more precisely shaped communications coverage area, for frequency reuse, communications privacy, and security needs, for example, including microcellular telephone coverage, communications inside mines, tunnels, buildings, ships or hallways, or for Radio Frequency Identification Device (RFID) tracking.

Figure 6:
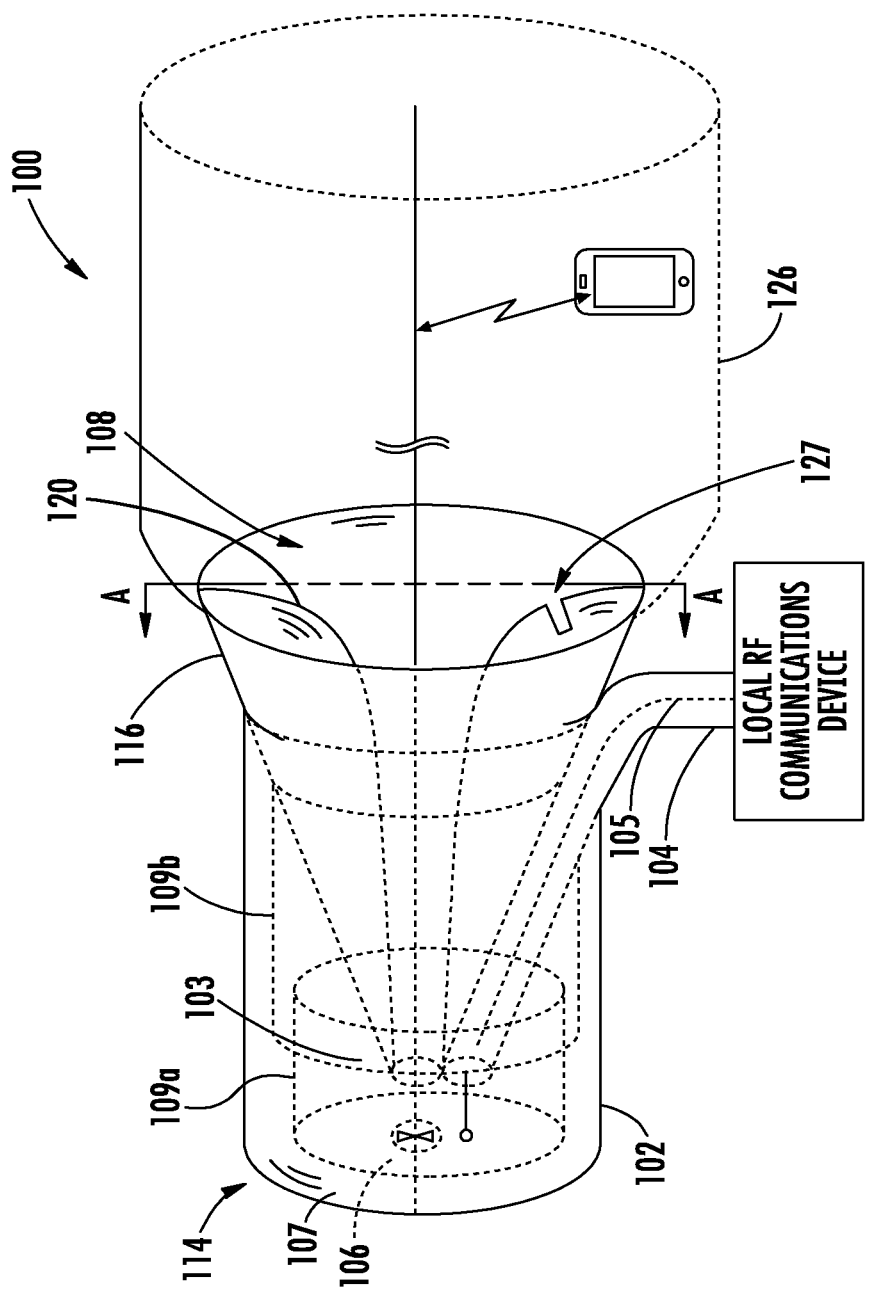
FIG. 6 is an orthographic view schematic diagram illustrating a radio frequency (RF) communications system according to another example embodiment. 0
Figure 6A:
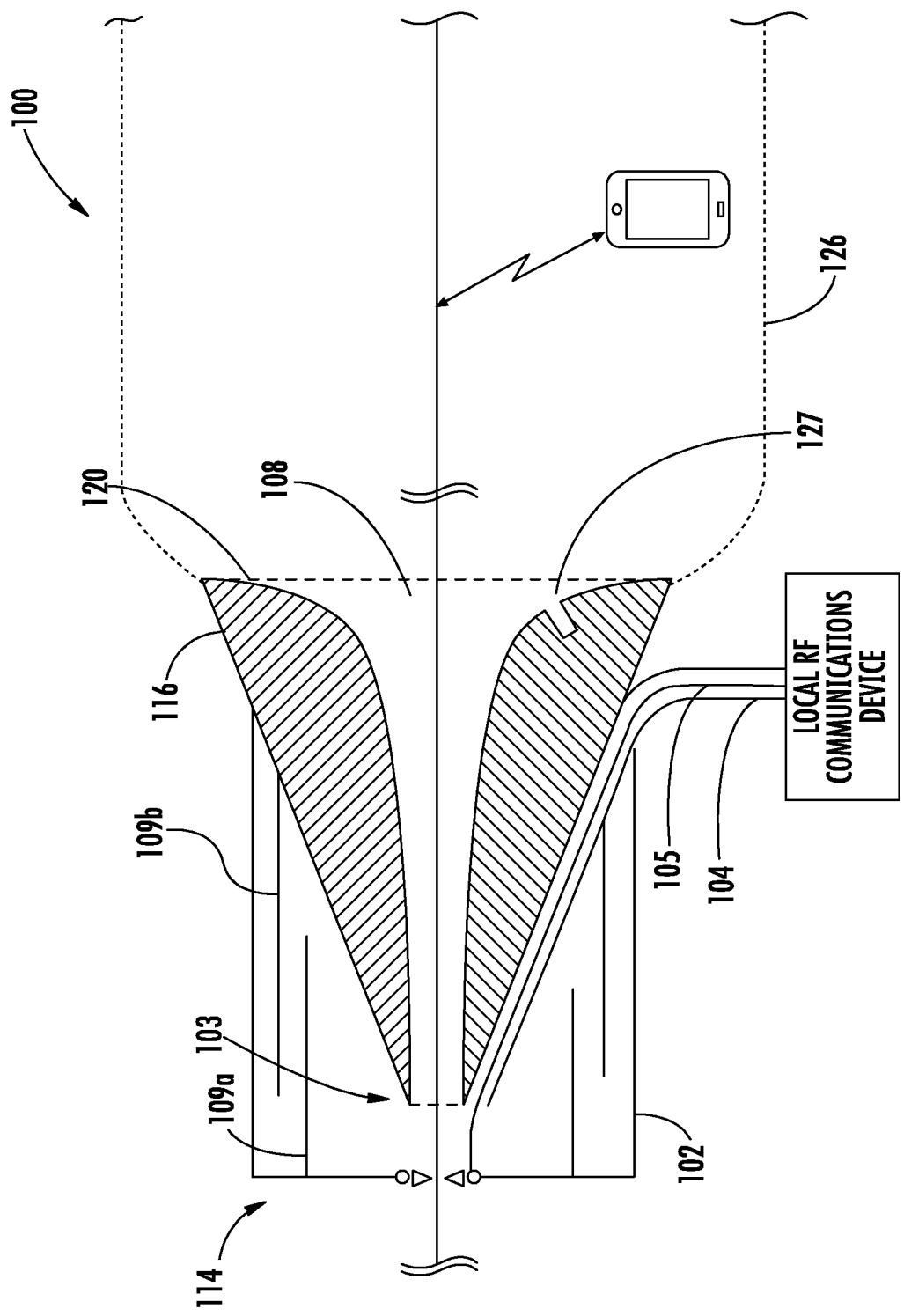
FIG. 6A is a sectional view of the FIG. 6 schematic diagram through the FIG. 6 cut plane AA.
Figure 7:
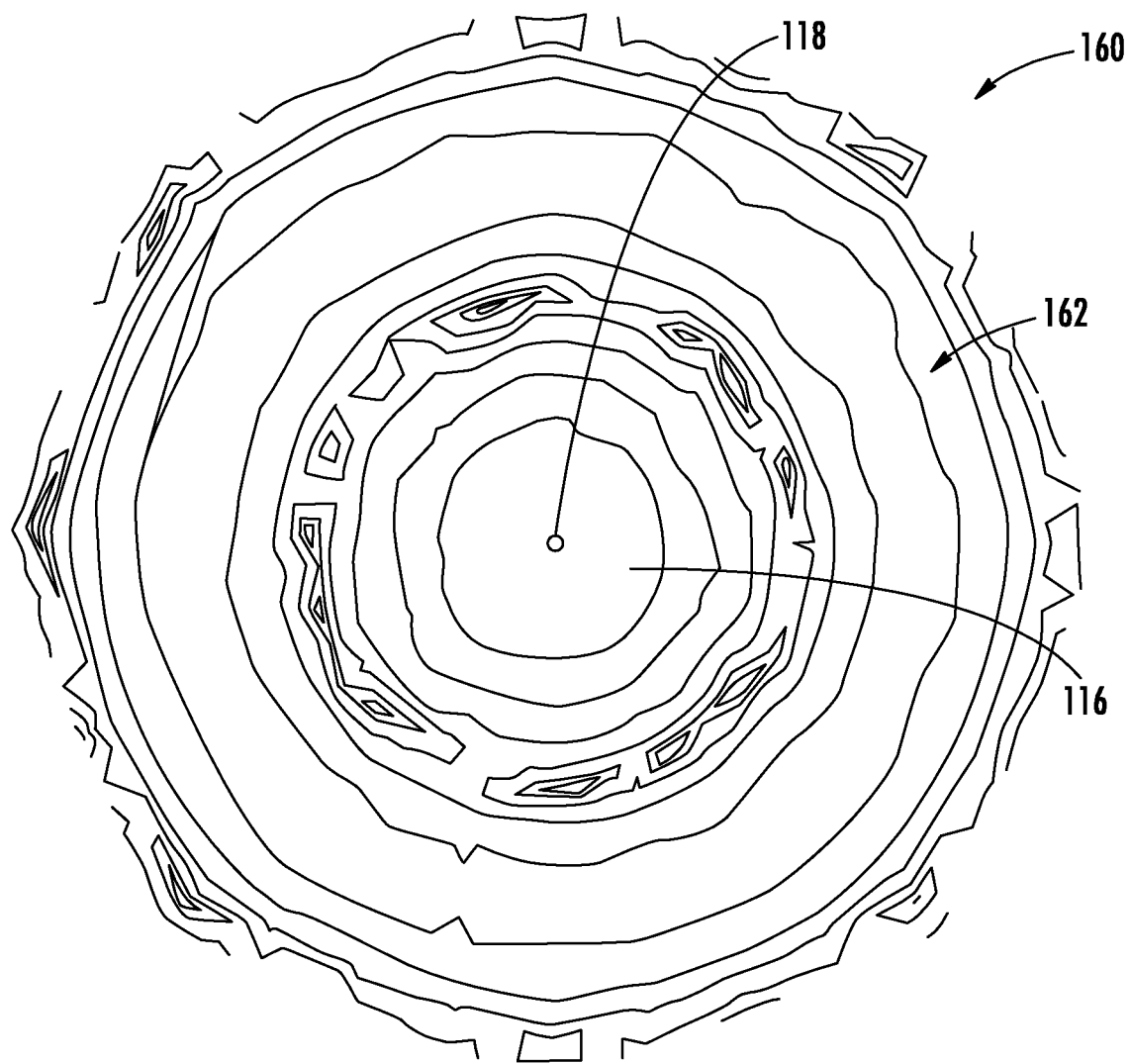
FIG. 7 is a cross sectional view of circularly polarized magnetic fields rendered according to the system in FIG. 6.

Turning now to FIG. 6, another example RF communications system 100 illustratively includes a local RF communications device 112, which may be similar to the local RF communications device described above, and an RF antenna 114 coupled to the local RF communications device. Similar to the antenna structure described above, the RF antenna 114 illustratively includes a conical RF launch structure 116, but in the illustrated embodiment the conical RF launch structure is a hollow conductive cone, rather than a helical winding in a conical shape. The conical RF launch structure 116 may be constructed of one or more conductive metals such as copper, aluminum, steel, or a wire mesh or rod cage etc. Moreover, as used herein, "conical" means generally resembling the shape of a cone, although the sidewalls may be curved in some embodiments (e.g., resembling a bell or bugle shape) as opposed to having linear sidewalls as shown in FIG. 7. One or more ridges 120 may be present inside the RF launch structure 116 for impedance matching. Ridges 120 may be curved metal plates or wires having shaped, curved, and/or with discrete steps to smoothly transform wave and electrical impedance. For example, the ridges 120 edges may have shapes of linear, binomial, or Klopstein polynomial or other curves to provide a low reflection transition between the coaxial cable 124 and the elongate electrical conductor(s) 118. Notches 127 may be present in the ridges 120 to provide series loading inductance. The RF antenna 114 further illustratively includes a resonant cavity backing housing 102, and an apex 103 of the conical RF launch structure 116 is positioned within the resonant cavity backing housing in the illustrated example. That is, the apex 103 is either coterminous with or inside of the open end of the resonant cavity backing housing 102. The conical launch structure 116 further has an open base end or mouth 108 positioned outside of the resonant cavity backing housing in the illustrated example. More particularly, in the illustrated example the cavity backing housing 102 is made of a conductive material (similar to the conical RF launch structure 116) and is cylindrical in shape with a back wall 107.

Resonant cavity backing 102 may contain one or more conductive folds 109a, 109b such as metal cylinder conductive folds. Conductive 109a attaches to the resonant cavity backing housing 102, and conductive fold 109b attaches to the conical RF launch structure 116. RF currents incur an increased distance of travel flowing in and out of the labyrinth of conductive folds 109a, 109b which increase the electrical size of the resonant backing cavity, for physical size reduction, and to provide for tuning. For instance, multiple tuning and a Chebyschev bandpass response may be provided.

The RF antenna 114 also includes an elongate electrical conductor(s) 118 similar to those described above having a proximal end extending through the apex 103 of the conical RF launch structure 116, and a distal end spaced apart from the conical RF launch structure to define an elongate RF coverage pattern 126. The system 100 advantageously allows one or more remote RF communications devices 130 within the elongate RF coverage pattern 126 to wirelessly communicate with the local RF communications device 112, either uni- or bi-directionally, as discussed above.

The system 100 may further illustratively includes a coaxial cable 124 extending between the local RF communications device 112 and the RF antenna 114. More particularly, the coaxial cable 124 illustratively includes an outer conductor 104 electrically coupled to the conical RF launch structure 116, and an inner conductor 105 electrically coupled to the elongate electrical conductor 118. In the illustrated configuration, this is accomplished via a clamp 116 (e.g., a conductive clamp or contact brush) to which the inner conductor 105 and the elongate electrical conductor 118 are both electrically connected. More specifically, the conductive clamp 106 is positioned behind the resonant cavity backing housing 102 so that the proximal end of the elongate electrical conductor 118 passes through an opening in the cavity backing housing to be physically connected to the conductive clamp. This configuration advantageously helps to eliminate wire forces on the antenna 114 while permitting a clamshell installation. That is, the antenna 114 may be provided in two halves and clamped over the elongate electrical conductor 118. This is because seam gaps will not be significant since there are no curling currents, as will be appreciated by those skilled in the art. A brush type clamp 106 may permit the elongate electrical conductor to slide back and forth through the RF antenna 114, say for rapid deployment of a bare elongate electrical conductor 118 from a reel.

In the illustrated example, the conductive clamp 106 serves as a grounding clamp and is electrically connected to the inner conductor 105 via the back wall 107 as shown. The coaxial feed configuration advantageously allows RF current to be applied between the apex 103 of the conical RF launch structure 116 and the cavity back wall 107 without the inner conductor 105 having to bear elongate electrical conductor 118 tensile forces. By way of example, for an impedance of 50 Ohms at the apex 103 of the conical RF launch structure 116, a diameter $Z_0$ at the mouth or base 108 of the conical RF launch structure will be as follows:

$$Z_0 = \frac{138\Omega}{\sqrt{\epsilon_r}} \log_{10} \frac{D}{d} = 377 \text{ ohms at cone mouth}$$

where d is the wire diameter, and D is the cone diameter.

Referring additionally to FIG. 7, a cross sectional cut 160 shows magnetic field strength contours 162 at an intermediate point along the elongate electrical conductor 118 are shown. The conical RF launch structure 116 is seen in profile in the center and the elongate electrical conductor 118 is oriented out of the page. The contours 162 were obtained by finite element simulation and are for an instant in time without any averaging. Dissimilar to FIG. 4 above, the magnetic field strength contours 162 are circles to resemble Archimedean spirals so the magnetic flux lines may be circles as well. The circular magnetic fields advance radially outwards in time about the elongate electrical conductor 118 as the excitation phase advances and the electromagnetic energies propagate. The conical RF launch structure 116 produces linear polarization and the spiral conical RF launch structure 16 produces circular polarization.

Generally speaking, the coverage distance of the elongate RF coverage pattern 126 off the elongate electrical conductor 118 may be adjusted by making various changes to the elongate electrical conductor. For example, one such adjustment is to use a coating on the elongate electrical conductor 118, such as a coated wire. Another approach is to use more than one wire for the elongate electrical conductor 118, which may be twisted together in some instances. Still another approach is to use a solid wire(s) vs. a hollow wire. Furthermore, one or more spaced apart antennas (e.g., such as the antennas 40, 42, 44 discussed above with reference to FIG. 5) may also be used to affect the elongate RF coverage pattern 126. A method aspect is to vary the operating frequency in order to vary the radial field strength away from the elongate electrical conductor 118. Spaced apart antennas 40, 42, 44 may be used to vary the radial signal strength. Spaced apart antennas 40, 42, 44 may be excited by conductive contact to the elongate electrical conductor 118, or they may excited by being in proximity to the elongate electrical conductor 118 and without conductive electrical contact, e.g., by induction coupling.

Figure 8:
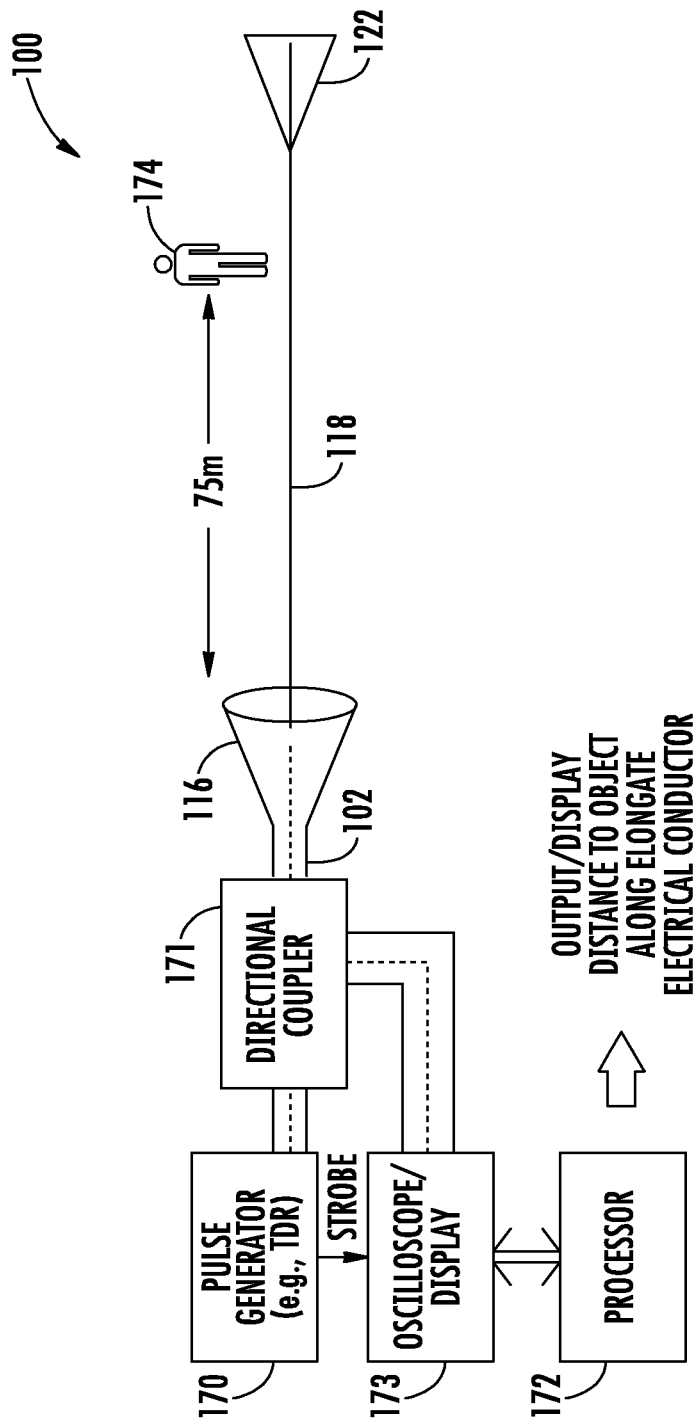
FIG. 8 is a schematic diagram of the system of FIG. 6 which is adapted to provide proximity detection in accordance with an example implementation.

Turning now to FIG. 8, in addition to providing wireless communications between the local RF communications device 112 and the remote RF communications device(s) 130, the system may also be used to detect the presence and location of objects or persons adjacent to the elongate electrical conductor 118. In the present example, the system 100 further illustratively includes a pulse generator 170, such as a time domain reflectometer (TDR), coupled to the elongate electrical conductor 118 via a directional coupler 171. A processor 172 and oscilloscope/display 173 are also provided, and the processor may cooperate with the pulse generator 170 to determine a distance to an object 174 (a person in the illustrated example) adjacent the elongate electrical conductor 118 along a length thereof. More particularly, as the object 174 (a person in the present example) comes within the elongate RF coverage pattern 126, the impedance mismatch with respect to the object will cause a reflection as follows:

$$\Gamma = \frac{\eta_2 - \eta_1}{\eta_2 + \eta_1} = \frac{377 - 50}{377 + 50} = 0.77 \text{ or } 77\%$$

where $\eta_2$ is the impedance associated with the elongate electrical conductor 118, and $\eta_1$ is the impedance associated with the object 174. In this example, the elongate electrical conductor 118 is coated with an isoimpedance magnetodielectric coating ($\mu_r = \epsilon_r$)>1, such as nickel zinc ferrite with an impedance of 377 Ohms. As the radio waves are launched axially along the elongate electrical conductor 118 as surface waves, the electric and magnetic fields of the radio wave are dragged and refracted (i.e., bent) into the coating, guiding the wave to prevent radiation and spreading loss. However, as noted above, a coating need not be used in all embodiments. Moreover, because of the water content of a person, the value of $\eta_1$ will be approximately 50 Ohms. When these values are applied to the above formula, this results in a 77% reflectivity at a distance of 75 m along the elongate electrical conductor 118. Generally speaking, the range to the object 174 may be determined as follows:

Range=$c(\Delta t)/2$, where c is the speed of light (0.3 meters/nanosecond in air), and $\Delta t$ is the time elapsed between pulse transmission and reflection. Generally speaking, a $\Delta t$ of 2 nanoseconds is equivalent to a range of about one foot.

At the oscilloscope 173, the reflection will appear as a spike or peak in the waveform at the given location along the length of the elongate electrical conductor 118. The detection of the object 174 adjacent the elongate electrical conductor 118, and optionally the distance to the object, may also be output by the processor 172 as an alert to a system operator or other designated recipients, for example. Various enhancement operations may also be performed by the processor 172 in some embodiments, such as smoothing, averaging, covariance matrix detection, and circularly polarized (CP) polarization sensing, for example. At least one termination load 122 (which may be similar to those described above) is also coupled to the distal end of the elongate electrical conductor 118 in the illustrated example.

It should be noted that sensing embodiment illustrated in FIG. 8 is not restricted solely to pulse reflectometry. The above-described approach may use other suitable radar, reflectometry and sounding techniques. For instance, a wideband chirp sounding waveform may be used in place of the pulse excitations and the sensing process by Fourier transform of the reflected energy to provide increased resolution and target information. Digital signal processing techniques such as covariance detection are also contemplated. The embodiment shown in FIG. 8 provides for personnel detection, intrusion alarm, and for diagnostic checks of elongate electrical conductor 118 integrity.

Figure 9:
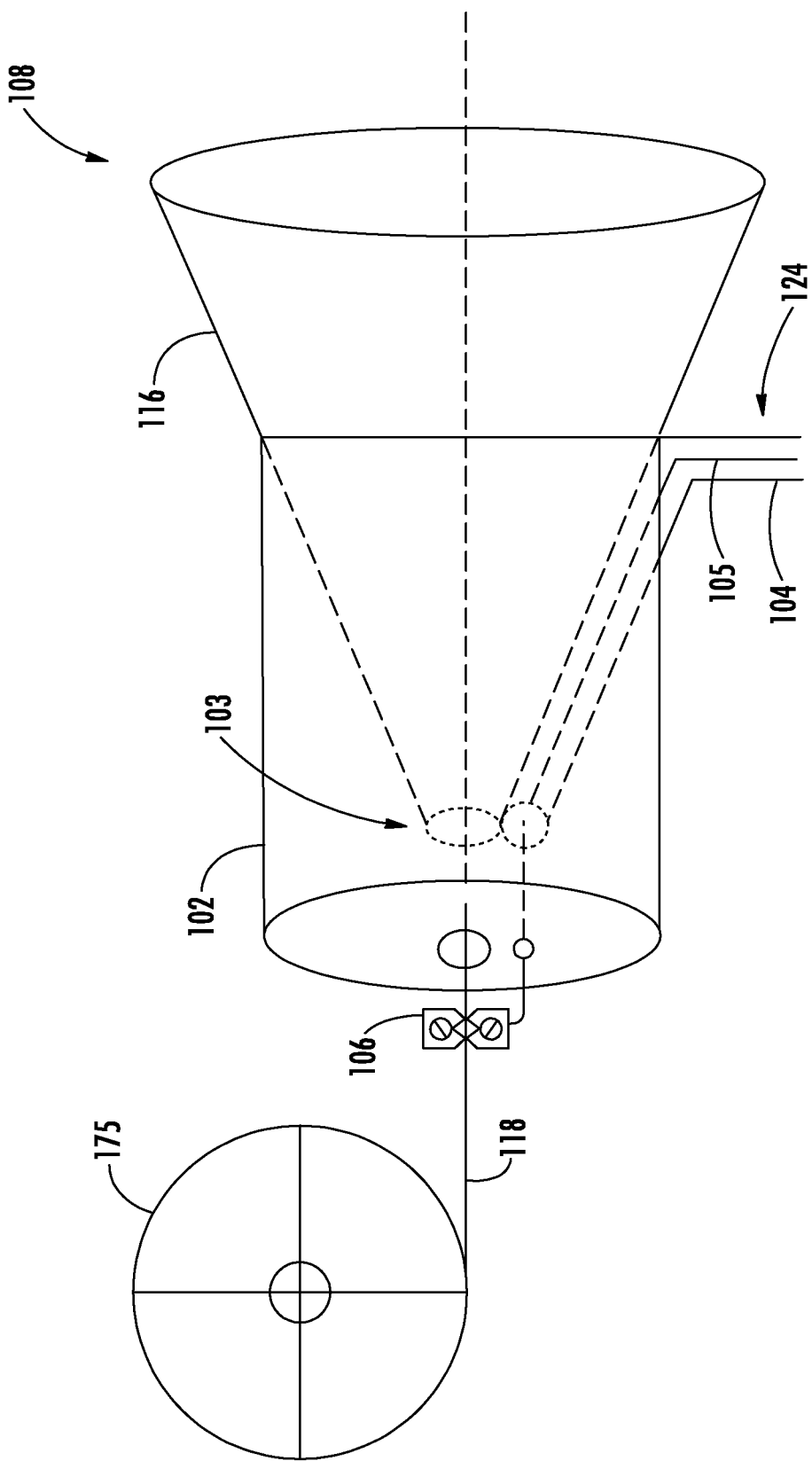
FIG. 9 is a schematic diagram of the RF antenna of the system of FIG. 6 including a reel to deploy the elongate electrical conductor thereof in accordance with an example embodiment.

Referring additionally to FIG. 9, in some implementations the antenna 114 may be portable to deploy at different locations where a suitable communications infrastructure is not otherwise available, such as in remote locations or where natural disasters have occurred. To this end, the elongate electrical conductor 118 may be carried on a reel 175 to be easily changed between stored and deployed positions at a remote or temporary location. As noted above, the cavity backing housing 102 and the conical RF launch structure 116 may be assembled in a two-piece or clam shell fashion with the elongate electrical conductor 118 as it is deployed. Due to the conductive clamp 106 the elongate electrical conductor 118 is not electrically active past the back wall 107.

Figure 10:
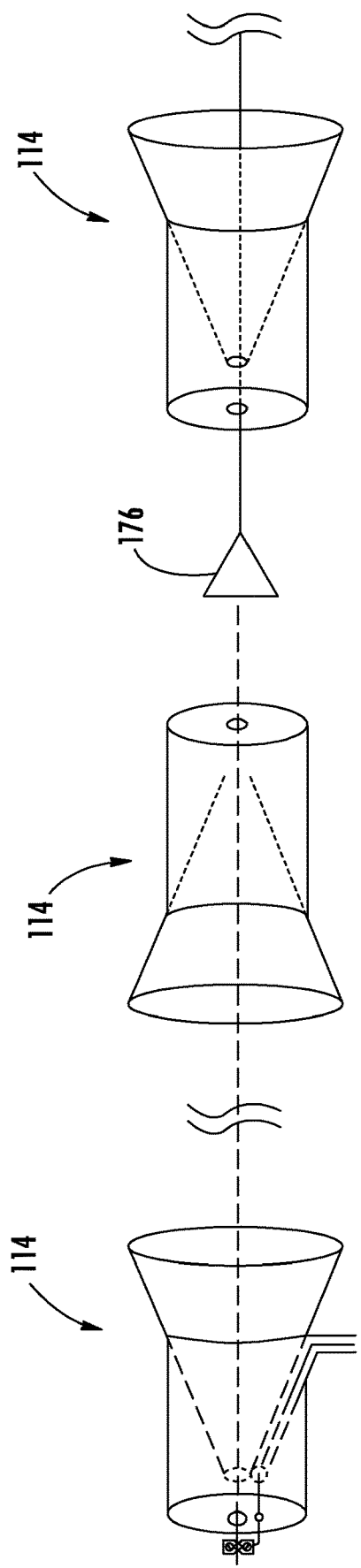
FIG. 10 is a schematic diagram of the RF antenna of FIG. 6 coupled with a series of repeaters to extend the elongate RF coverage pattern thereof.

In applications where a large coverage area is desired, the system 100 may further include additional antennas 114 and associated amplifiers 176 as spaced apart repeaters coupled to the elongate electrical conductor 118. Generally speaking, the elongate RF coverage pattern 126 may extend for several miles without repeaters (e.g., 20 to 50 miles), and may be extended indefinitely with a series of bidirectional repeaters as shown in FIG. 10. In accordance with one example, the antenna 114 may be deployed along roadways through isolated areas (e.g., mountains, deserts, etc.) where other communications infrastructure (e.g., cellular towers) would be cost prohibitive to deploy. In such a configuration, the elongate electrical conductor 118 may be mounted on roadside utility poles, etc., and the elongate RF coverage pattern 126 may be configured to extend to motorists on or adjacent the roadway so that they may have continuous cellular service, notwithstanding that they are not within range of any traditional cellular network towers. By way of example, the antenna 114 is generally operable at frequencies above the horn lower cutoff frequency, which is ⅓ wavelength diameter at the mouth. Another particularly advantageous aspect of the antenna 114 is that it will work with turns or bends in the elongate electrical conductor 118. Generally speaking, a radius of curvature of ½ wavelength may be used as a guide for acceptable curvatures, which is approximately equal to six inches at 1000 Mhz. Another similar application is along border fences, for example.

Figure 11:
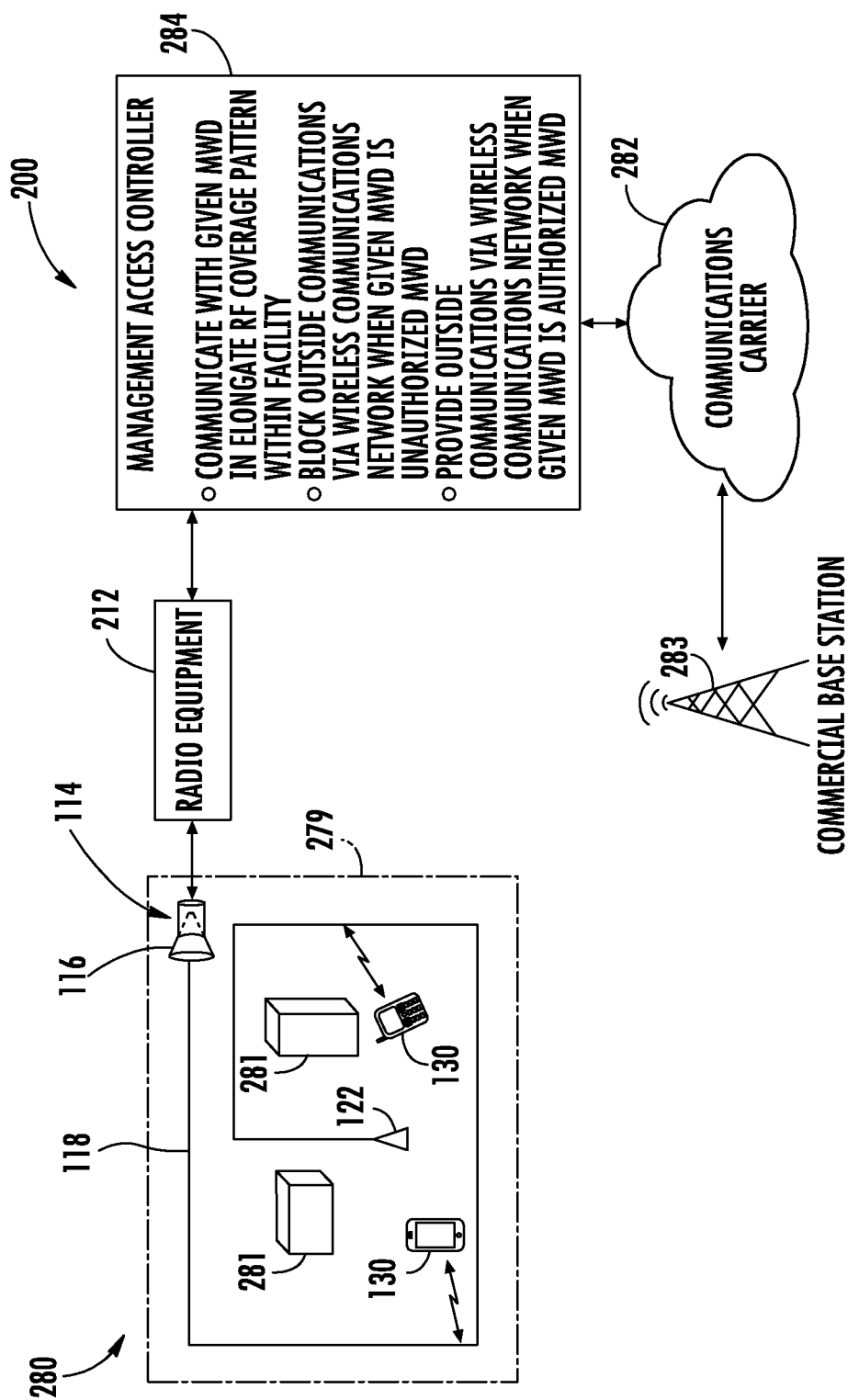
FIGS. 11 and 12 are schematic diagrams of different managed access systems which both incorporate an RF antenna of the system of FIG. 6.

One particular application in which one or more of the above-described shaped coverage antennas may be used is in a managed access system, such as the system 200 shown in FIG. 11. Generally speaking, a managed access system may be used to permit communications from authorized mobile wireless devices while detecting and disrupting wireless communications from unauthorized or contraband mobile wireless devices within a protected facility, such as a correctional facility. Managed access systems may also be used in many other facilities as well, including non-secure and secure buildings such as government offices, military compounds, corporate workplaces, marine vessels or ships, and other areas where managed access is desirable to detect and disrupt wireless communications from contraband and unauthorized mobile wireless devices, yet permit authorized users to communicate either internally within the facility or with an outside commercial communications network. In some implementations, the authorized users may be those that pay for access while the unauthorized users are those that do not pay for access (e.g., on a cruise ship at sea).

In the illustrated example, a protected facility 280 includes a bounded area 279 with a plurality of buildings 281 therein. The facility 280 is geographically within a wireless communications network of a communications carrier 282, which is illustratively represented by a commercial base station/cellular tower 283 in FIG. 11. For example, the communications carrier may operate a cellular communications network for communicating with mobile wireless devices (MWDs) 130 (e.g., mobile phones, tablet computers, etc.). The managed access system 200 further illustratively includes one or more of the above-described RF antennas 114 arranged at the facility 280 and including the conical RF launch structure 116, and an elongate electrical conductor 118 having a proximal end extending through the RF launch structure and a distal end spaced apart from the RF launch structure to define an elongate RF coverage pattern, as discussed above. In the illustrated example, the elongate electrical conductor 118 is positioned along the perimeter of the facility 280 (e.g., it may be deployed along a fence line) and is also routed around or between the buildings 281. In other words, the elongate electrical conductor 118 is routed throughout the facility so that a user will have wireless coverage (i.e., be within the elongate coverage pattern) anywhere within the facility, but not outside of the facility.

The system 200 further illustratively includes radio equipment 212 coupled to the RF antenna(s) 114, and a management access controller 284 cooperating with the radio equipment to communicate with a given MWD 130 in the elongate RF coverage pattern within the facility 280, block outside communications via the wireless communications network (i.e., via the base station 283) when the given MWD is an unauthorized MWD, and provide outside communications via the wireless communications network when the given MWD is an authorized MWD, as noted above. Again, one advantageous example where such a system may be employed is operation at a jail next to a courthouse, where you want contraband cell phones queried or jammed, but not those of officers or court officials.

Figure 12:
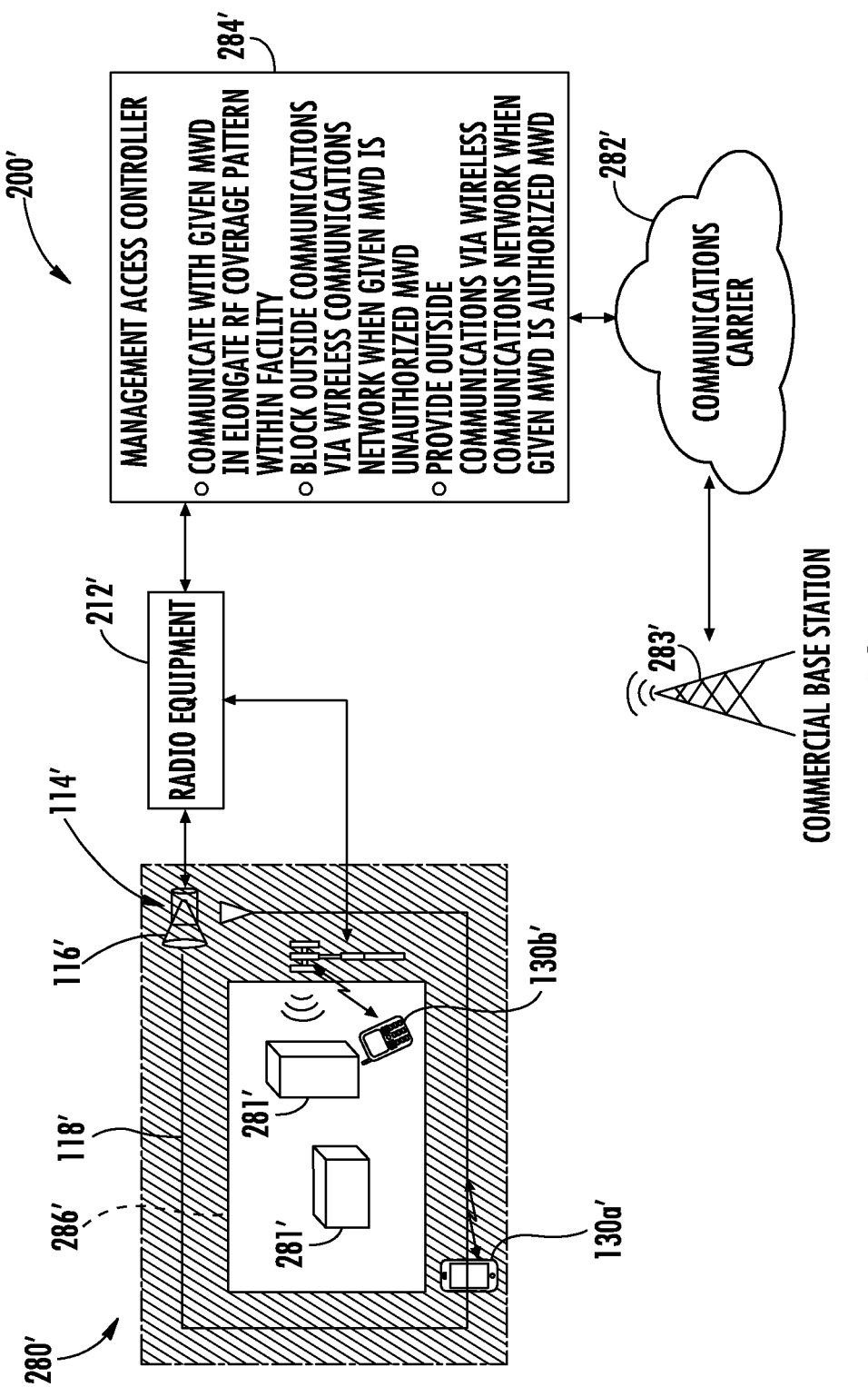

In accordance with another similar embodiment of the managed access system 200' shown in FIG. 12, the RF antenna 114' may be used in conjunction with other types of antennas, such as one or more directional antennas 285'. In this example, the elongate electrical conductor 118' is routed around the perimeter of the facility 280' so that the elongate electrical pattern is represented by the shaded area between the inner and outer dashed lines 279', 286', while the coverage area of the directional antenna(s) 285' is within the inner dashed line. Thus, an MWD 130a' would communicate via the antenna 114', while the MWD 130b' would communicate via the directional antenna 285', both of which are connected to the radio equipment 212' as shown. Again, it should be noted that the RF antenna configurations described with reference to FIGS. 1A and 1B above (or other similar wireline or surface wave antennas) may also be used in conjunction with, or instead of, the RF antenna 114 in different embodiments.

Further details regarding managed access systems which may be incorporated with the above described embodiments are set forth in co-pending application Ser. Nos. 14/865,277; 14/865,308; 14/865,355; 14/865,400; 14/865,466; 15/153,770; 15/153,786; and entitled MOBILE WIRELESS DEVICE MANAGED ACCESS SYSTEM PROVIDING ENHANCED AUTHENTICATION FEATURES AND RELATED METHODS, which are also assigned to the present Assignee and are all hereby incorporated herein in their entireties by reference. Further information on surface wave antennas may be found in U.S. Pat. Pub. No. 2015/0130675 to Parsche, which is also assigned to the present Assignee and is hereby incorporated herein in its entirety by reference.

Many modifications and other embodiments will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A radio frequency (RF) communications system comprising:
    a local RF communications device;
    an RF antenna coupled to the local RF communications device and comprising
        a cavity backing housing,
        a conical RF launch structure having an apex positioned within the cavity backing housing, and an elongate electrical conductor having a proximal end extending through the apex of the conical RF launch structure, and a distal end spaced apart from the conical RF launch structure to define an elongate RF coverage pattern; and at least one remote RF communications device within the elongate RF coverage pattern to wirelessly communicate with the local RF communications device.

2. The RF communications system of claim 1 wherein the RF antenna further comprises a clamp positioned behind the cavity backing housing; and wherein the proximal end of the elongate electrical conductor is connected to the clamp.

3. The RF communications system of claim 1 further comprising a coaxial cable extending between the local RF communications device and the RF antenna, the coaxial cable having an outer conductor electrically coupled to the conical RF launch structure and an inner conductor electrically coupled to the elongate electrical conductor.

4. The RF communications system of claim 1 wherein the cavity backing housing comprises a cylindrical cavity backing housing.

5. The RF communications system of claim 1 wherein the conical launch structure further has an open base end positioned outside of the resonant cavity backing housing.

6. The RF communications system of claim 1 further comprising a time domain reflectometer (TDR) coupled to the elongate electrical conductor and configured to determine a distance to an object adjacent the elongate electrical conductor along a length thereof.

7. The RF communications system of claim 1 further comprising a reel, and wherein the elongate electrical conductor is carried by the reel in a stored position.

8. The RF communications system of claim 1 further comprising at least one termination load coupled to the distal end of the elongate electrical conductor.

9. The RF communications system of claim 1 further comprising a plurality of spaced apart conductors coupled to the elongate electrical conductor.

10. The RF communications system of claim 1 further comprising a plurality of spaced apart repeaters coupled to the elongate electrical conductor.

11. A radio frequency (RF) antenna to be coupled to a local RF communications device to provide an elongate RF coverage pattern, the RF antenna comprising:
    a cavity backing housing;
    a conical RF launch structure having an apex positioned within the cavity backing housing; and
    an elongate electrical conductor having a proximal end extending through the apex of the conical RF launch structure, and a distal end spaced apart from the conical RF launch structure to define the elongate RF coverage pattern to permit at least one remote RF communications device within the elongate RF coverage pattern to wirelessly communicate with the local RF communications device.

12. The RF antenna of claim 11 further comprising a clamp positioned behind the cavity backing housing; and wherein the proximal end of the elongate electrical conductor is connected to the clamp.

13. The RF antenna of claim 11 wherein the cavity backing housing comprises a cylindrical cavity backing housing.

14. The RF antenna of claim 11 wherein the conical launch structure further has an open base end positioned outside of the resonant cavity backing housing.

15. The RF antenna of claim 11 further comprising at least one termination load coupled to the distal end of the elongate electrical conductor.

16. The RF antenna of claim 11 further comprising a plurality of spaced apart conductors coupled to the elongate electrical conductor.

17. The RF antenna of claim 11 further comprising a plurality of spaced apart repeaters coupled to the elongate electrical conductor.

18. The RF antenna of claim 11 where the conical launch structure comprises at least one ridge plate.

19. A radio frequency (RF) communications method comprising:
    using an RF antenna coupled to a local RF communications device, the RF antenna comprising a cavity backing housing, a conical RF launch structure having an apex positioned within the cavity backing housing, and an elongate electrical conductor having a proximal end extending through the apex of the conical RF launch structure and a distal end spaced apart from the conical RF launch structure to define an elongate RF coverage pattern; and
    using at least one remote RF communications device within the elongate RF coverage pattern to wirelessly communicate with the local RF communications device.

20. The method of claim 19 wherein the RF antenna further comprises a clamp positioned behind the cavity backing housing; and wherein the proximal end of the elongate electrical conductor is connected to the clamp.

21. The method of claim 19 wherein the RF antenna further comprises a coaxial cable coupled between the local RF communications device and the RF antenna with an outer conductor of the coaxial cable electrically coupled to the conical RF launch structure, and an inner conductor of the coaxial cable electrically coupled to the elongate electrical conductor.

22. The method of claim 19 wherein the cavity backing housing comprises a cylindrical cavity backing housing.

23. The method of claim 19 wherein the conical launch structure further has an open base end positioned outside of the resonant cavity backing housing.

24. The method of claim 19 wherein the elongate electrical conductor is carried by a reel in a stored position; and further comprising unwinding the elongate electrical conductor from the reel to space the distal end apart from the conical launch structure in a deployed position.

25. The method of claim 19 wherein the antenna further comprises at least one termination load coupled to the distal end of the elongate electrical conductor.

26. The method of claim 19 wherein the conical launch structure comprises at least one ridge plate.

* * * * *